United States Patent
Bart et al.

(10) Patent No.: US 12,499,195 B2
(45) Date of Patent: Dec. 16, 2025

(54) SYSTEMS AND METHODS FOR IDENTITY AUTHENTICATION AND FEEDBACK

(71) Applicant: Idemia Identity & Security USA LLC, Reston, VA (US)

(72) Inventors: Randy Bart, Foothill Ranch, CA (US); Loic Fabro, Reston, VA (US)

(73) Assignee: Idemia Identity & Security USA LLC, Reston, VA (US)

(*) Notice: Subject to any disclaimer, the term of this patent is extended or adjusted under 35 U.S.C. 154(b) by 351 days.

(21) Appl. No.: 18/186,819

(22) Filed: Mar. 20, 2023

(65) Prior Publication Data

US 2023/0325484 A1 Oct. 12, 2023

Related U.S. Application Data

(60) Provisional application No. 63/322,463, filed on Mar. 22, 2022.

(51) Int. Cl.
*G06F 21/32* (2013.01)
*G06V 10/74* (2022.01)
*G06V 40/10* (2022.01)

(52) U.S. Cl.
CPC ............ *G06F 21/32* (2013.01); *G06V 10/761* (2022.01); *G06V 40/155* (2022.01)

(58) Field of Classification Search
CPC ..... G06F 21/32; G06V 10/761; G06V 40/155
See application file for complete search history.

(56) References Cited

U.S. PATENT DOCUMENTS

| | | |
|---|---|---|
| 10,219,157 B1 | 2/2019 | Jiang |
| 10,747,992 B1 | 8/2020 | Miu |
| 10,943,471 B1 | 3/2021 | Giobbi |
| 2016/0065908 A1 | 3/2016 | Chang |
| 2017/0011210 A1* | 1/2017 | Cheong .................. G06F 21/32 |
| 2017/0264608 A1* | 9/2017 | Moore .................. G07C 9/257 |
| 2019/0325125 A1* | 10/2019 | Pantfoerder ............ G06F 21/32 |
| 2020/0311237 A1 | 10/2020 | De Vos |
| 2022/0114245 A1* | 4/2022 | Krishan .................. G06F 21/32 |
| 2022/0232390 A1 | 7/2022 | Fouchard |

* cited by examiner

*Primary Examiner* — Juan M Guillermety
(74) *Attorney, Agent, or Firm* — Armstrong Teasdale LLP

(57) ABSTRACT

A system for authenticating a first user to a second user is described. The system includes a memory device having instructions stored thereon, a camera device associated with the second user, and a processor in communication with the memory device and the camera device wherein the processor is configured to execute the instructions. The instructions cause the processor to establish, based upon data received at the camera device from a first user device associated with the first user, a communication channel with the first user device and receive, via the communication channel, a mobile identification (mID) provided by the first user device. The instructions also cause the processor to determine whether to authenticate the first user based upon credential data extracted from the mID provided by the first user and initiate, based upon the determination, feedback to the second user indicating whether the first user was authenticated.

17 Claims, 4 Drawing Sheets

SYSTEMS AND METHODS FOR IDENTITY AUTHENTICATION AND FEEDBACK

CROSS REFERENCE TO RELATED APPLICATIONS

This application claims the benefit of priority to U.S. Provisional Patent Application No. 63/322,463, filed Mar. 22, 2022, which is incorporated herein by reference in its entirety.

FIELD

The field of the disclosure relates generally to systems and methods for authentication and feedback, and more specifically, to systems and methods for authentication/verification of a suspect identity and providing feedback regarding the authentication/verification.

BACKGROUND

Some traditional document validation systems verify a credential document, such as a physical driver's license, a passport, or another form of identification document, contains valid information. For example, some conventional systems may verify the information contained by a driver's license presented to a law enforcement or security officer is valid, inasmuch, for example, as the driver's license itself is not a fraudulent document. However, many such systems do not authenticate the identity of the individual presenting the credential document.

Rather, in many traditional validation scenarios, although a credential document presented may be valid, no additional mechanism exits for verifying the person presenting the credential document is the actual individual identified by the credential document (e.g., the real owner of the document). Further, when a law enforcement officer, as an example, needs to verify a mobile ID (mID), they often have their hands on a variety of items (e.g., flashlight, firearm, etc.) and do not have a free hand to, for instance, scan an mID from a mobile phone.

Systems and methods for authentication during the presentation of any of a variety of credential information, such as mID information, are thus desired. More particularly, systems and methods for hands-free validation of identity data and authenticating a person presenting the identity data are desirable.

BRIEF DESCRIPTION

In one aspect, a system for authenticating a first user to a second user is described. The system includes a memory device having computer executable instructions stored thereon, a camera device associated with the second user, and a processor in communication with the memory device and the camera device wherein the processor is configured to execute the computer executable instructions. The instructions cause the processor to establish, based upon data received at the camera device from a first user device associated with the first user, a communication channel with the first user device and receive, via the communication channel, a mobile identification (mID) provided by the first user device. The instructions also cause the processor to determine whether to authenticate the first user based upon credential data extracted from the mID provided by the first user and initiate, based upon the determination, feedback to the second user indicating whether the first user was authenticated.

In another aspect, a non-transitory, computer readable storage medium having instructions stored thereon is described. The instructions, in response to execution by a processor, cause the processor to establish, based upon data received at a camera device from a first user device associated with a first user, the camera device in communication with the processor, a communication channel with the first user device and receive, via the communication channel, a mobile identification (mID) provided by the first user device. The instructions also cause the processor to determine whether to authenticate the first user based upon credential data extracted from the mID provided by the first user and initiate, based upon the determination, feedback to a second user indicating whether the first user was authenticated.

In yet another aspect, a computer-implemented method for authenticating a first user to a second user is described. The method includes establishing, based upon data received at a camera device from a first user device associated with the first user, the camera device in communication with a processor, a communication channel with the first user device and receiving, via the communication channel, a mobile identification (mID) provided by the first user device. The method also includes determining whether to authenticate the first user based upon credential data extracted from the mID provided by the first user and initiating, based upon the determination, feedback to the second user indicating whether the first user was authenticated.

DETAILED DESCRIPTION

Figure 1:
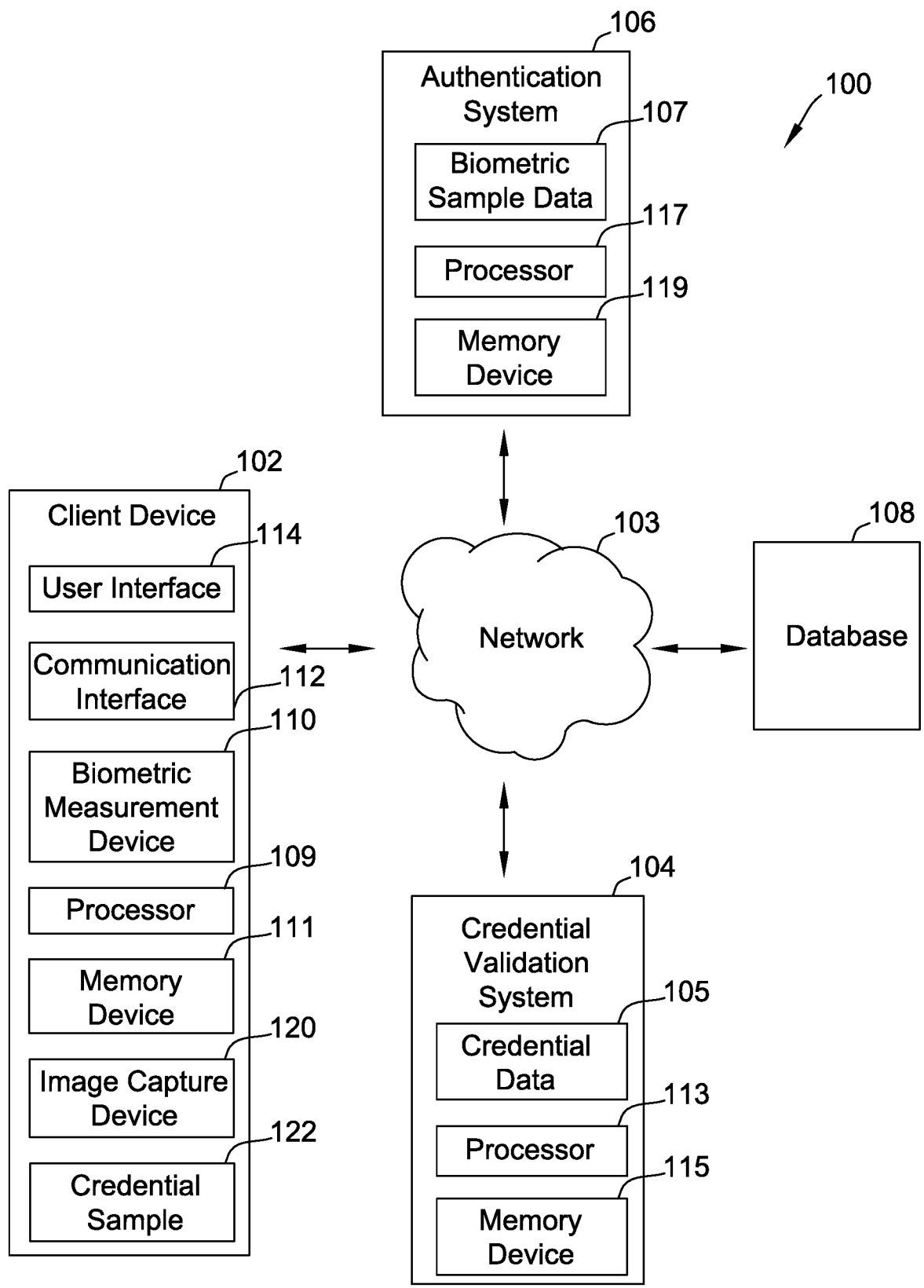
FIG. 1 is a block diagram illustrating an example embodiment of a system for authentication and validation.

The disclosed systems and methods provide for hands-free reading and validating/authenticating of a user credential (e.g., a mID at a traffic stop). Continuing the traffic stop example, typically a law enforcement officer will approach a vehicle with both hands occupied (e.g., one hand on a firearm and another on a flashlight). If a passenger of the vehicle that was pulled over has a user credential, the officer has to juggle the items they already have in their hands in order to scan the user credential (e.g., using a mobile device such as a cell phone). However, an officer's pockets are often full or unavailable and most agencies may not want to issue additional phones to officers.

The systems and methods described herein provide for reading of a code (e.g., a quick response (QR) code) on a mobile device and transfer of data (e.g., via bluetooth low energy (BLE), near-field communication (NFC), or Wi-Fi Aware) to start the process of validation/authentication between an officer and passenger of a vehicle. In the example embodiment, a code may be read by a body camera worn by an officer. A body camera (bodycam, body worn video (BWV), body-worn camera, or wearable camera) may include a wearable audio, video, or photographic recording system. Body cameras are often designed to be worn in one of three locations: on the torso, on or built into a helmet, and on or built into glasses. Body cameras may feature live streaming capabilities, GPS positioning, automatic offload to cloud storage, while others are based on local storage. Some body cameras offer automatic activation of the cameras with the ability to adhere to agency-specific body camera recording policies. Further, body cameras may have transfer of data capabilities (e.g., via bluetooth low energy (BLE), near-field communication (NFC), or Wi-Fi Aware).

In some embodiments, a separate device different from a body camera is envisioned. For example, the separate device may be a digital camera, smart phone, PDA, tablet, or the like (e.g., that may or may not be worn by a person). In some embodiments, the separate device is envisioned as performing the functions described elsewhere herein with respect to a body camera.

In the example embodiment, the code read by the body camera (e.g., or separate device) includes data regarding how the body camera should connect to the mobile device. In some embodiments, as examples, the body camera may connect to the mobile device via any of 1) NFC with BLE, 2) NFC with Wi-Fi Aware, 3) NFC only, 4) QR with BLE, 5) QR with NFC, or 6) QR with Wi-Fi Aware. Accordingly, the passenger can present their user credential, for example, by displaying a QR code on a mobile device to initiate the transaction. The body camera worn by the police officer (e.g., or a camera device such as a camera in the police vehicle) detects and scans the QR code to establish a communication channel and initiate the "transaction" (e.g., authenticating/validating).

Then, after the communication channel is established, the body camera receives the user credential by initiating a BLE, NFC, or Wi-Fi Aware connection either on the body camera (e.g., worn device) or another device either on the officer or in the vehicle (e.g., or elsewhere) connected to the body camera. The body camera or other/separate device enables the officer to capture the information hands free, in a safe manner, and, in some embodiments, according to certain standards (e.g., ISO 18013-5 standards).

Additionally, in some embodiments, once the user credential is read, the system conducts (e.g., at a device worn by the officer or another device/system in communication with the body camera) a 1:1 facial comparison match between the body camera stream of the passenger and the user credential (e.g., a biometric facial recognition comparison between the face of a passenger in the video stream from the body camera and a stored image of the passenger from the user credential/mID) in order to authenticate the passenger who presented the credential is in fact the owner of that credential. In some embodiments the 1:1 facial comparison occurs at the body camera. In some embodiments, the 1:1 facial comparison may occur at a system/device in communication with the body camera (e.g., in the cloud).

Once the 1:1 facial comparison is complete, the body camera or another device associated with the officer may provide an indication that the passenger identity is authenticated and the credential is validated (e.g., visual or haptic feedback). Similarly, a different indication may be provided when the validation and authentication are in progress, or if a passenger identity cannot be authenticated or the credential cannot be validated.

As used herein, the term "validation" means confirming information contained or included in a user credential is valid. In some embodiments, validation may thus include confirming such information is accurate and current, or "up to date." Likewise, in at least some embodiments, validation may also include confirming information included in a user credential is not fraudulent.

As used herein, "authentication" means confirming a user presenting a user credential is the real, or "authentic," owner of the user credential; or confirming a credential document itself is a real, or "authentic," document originating from an issuing authority such as a federal or state government, or agency thereof. For example, authentication may include comparing a photograph or facial image of the user obtained from a biometric measurement device, such as a camera, to a photograph or facial image of the user contained in the mID. In some embodiments, the photograph is translated into a template so that the comparison occurs at the template level and not at the actual image level. In some embodiments, raw images are used additionally or alternatively to templates.

Accordingly, as described in additional detail herein, validation and/or authentication steps may be implemented in combination to confirm, not only that a user credential supplied by the user is in fact valid, but also that the user who has provided the user credential for validation is the real, or authentic, owner of the credential and that the user credential has therefore not been obtained and/or fraudulently provided by a person who is not the real or authentic subject, or owner, of the credential (e.g., if someone gave another person their mobile/smart device with the mID available on it). In other words, in some embodiments, the mID or other credential is accessible on the mobile/smart device. In some embodiments, credentials may additionally/alternatively be stored elsewhere (e.g., on other networks or hosted on cloud servers).

As used herein, the term "user credential" or "credential" may include any physical or digital form of credential document, identification, or other documentation associated with a user that may be used to identify the user. For example, in at least some embodiments, user credentials may include any form of photo identification (photo ID), such as a driver's license, passport, or other government or non-government issued photo ID. In some embodiments, user credentials may include permissions and privileges (e.g., not just identity attributes such as a "driving privilege" or "right to hunt/fish in a specific location"). For example, data shared from a user credential may be data received from one or more issuing authorities. As an example, data stored in the user credential may be received from a Department of Motor Vehicles (DMV) and a local hospital (e.g., examples of data stored in the user credential include DMV portrait, DMV first name, DMV last name, DMV document number, Hospital driver license number, Hospital first name, Hospital last name, Hospital covid-19 vaccine name, Hospital covid-19 vaccination date). Likewise, in some embodiments, user credentials may include transaction instruments, such as payment cards (e.g., credit and debit cards). In some embodiments, a user credential may include a plurality of user credentials. In some embodiments, user credentials are digital (e.g., a mID) and may include digital wallet data and/or any other information stored on a memory device that can be used to identify a user. Accordingly, user credentials may include, as described variously herein, both physical forms of identification, payment, and the like, as well as digital forms of the same.

In some embodiments, only a portion of a user credential may be shared. In some embodiment, a user may select (e.g., at a user/client device) a portion of the user credential to share. For example, a user may select to only share a portion of the user credential to a law enforcement officer (e.g., certain driver license and insurance information such as doc number, portrait, first name, last name, vehicle information, insurance name, and expiration date for insurance) and not other information unnecessary for the law enforcement office (e.g., home address).

Figure 2:
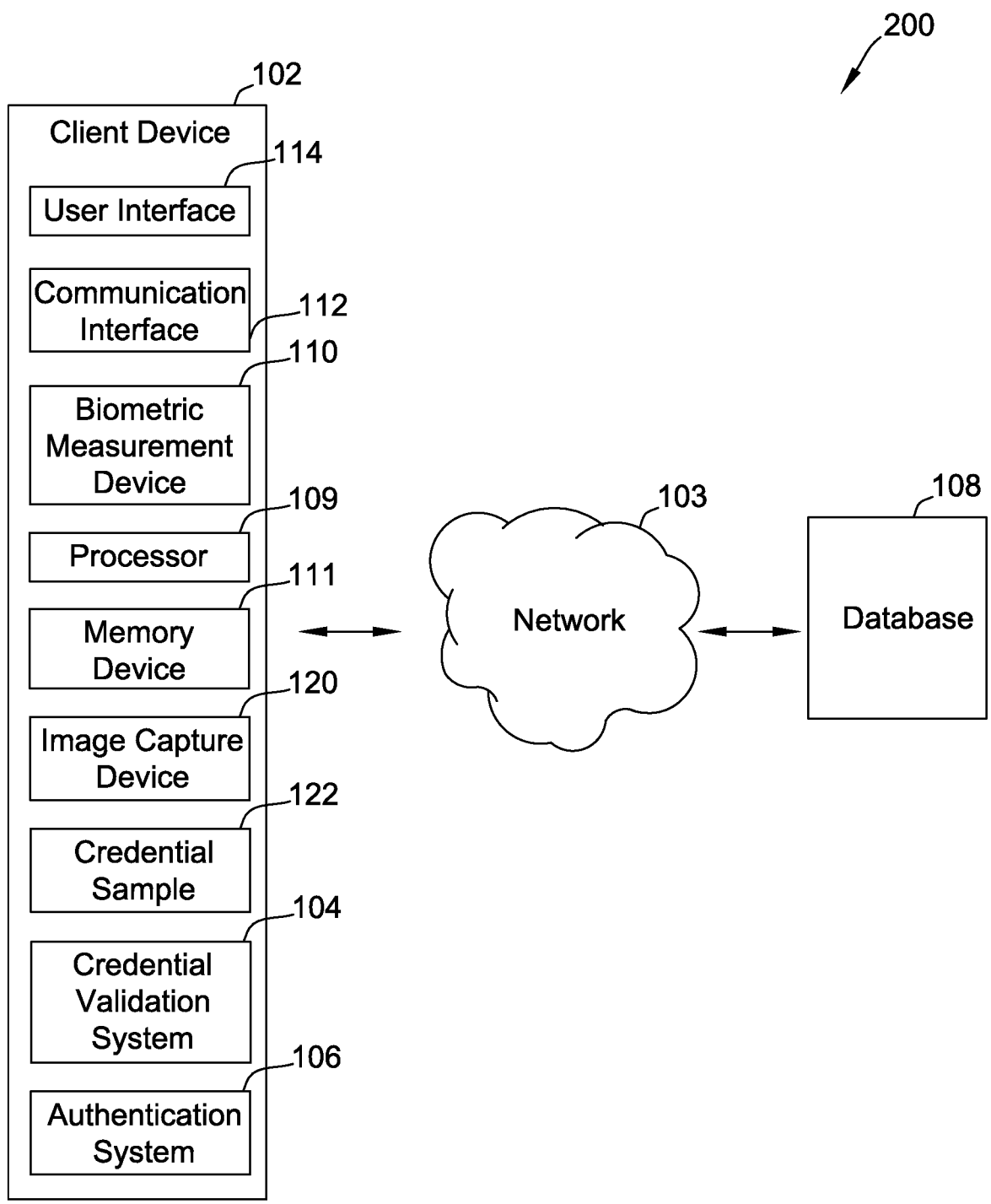
FIG. 2 is a block diagram illustrating another example of the client device shown in FIG. 1.

FIG. 1 is a block diagram illustrating an example embodiment of a system 100 for biometrically authenticating and validating a user based on a user credential. In the example embodiment, system 100 includes a client device 102, a credential validation system 104, an authentication system 106, and/or an issuing authority system/database 108. In some embodiments, validation system and/or authentication system 106 may be included in client device 102 (e.g., as shown in FIG. 2). As described herein, system 100 may, in various implementations, include, at least in part, any of a variety of systems and/or devices arranged to measure and/or receive biometric information of a user and/or one or more documents of a user, such as any government system (e.g., airport security systems, motor vehicles department systems, etc.) as well as any non-government system, such as a payment processor system (e.g., a banking system), and the like.

Accordingly, in the example embodiment, client device 102 may be any device that captures a biometric sample, such as one or more facial images and/or one or more fingerprint samples (e.g., fingerprint images and/or fingerprint scans). In the example embodiment, client device 102 may include a body-worn camera (e.g., typically worn by a law enforcement officer), referred to as a body camera. In some embodiments, client device 102 may be a computing device, such as a personal computing device, a smartphone, a tablet, and the like. Likewise, in some embodiments, client device 102 may be any other computing device that captures one or more biometric samples, such as an image capture device and/or fingerprint scanner in an airport, at a motor vehicles department, and the like.

In at least some embodiments, client device 102 may include a biometric measurement device 110, a communication interface 112, and/or a user interface 114. As described herein, biometric measurement device 110 may be any device that collects a biometric sample, such as an image of the user, a fingerprint sample of the user, and the like. Thus, biometric measurement device 110 may be a camera and/or an array or group of cameras (e.g., for three-dimensional facial imaging, iris detection and/or imaging an iris of the human eye), a fingerprint scanner, a microphone (e.g., for heartbeat measurement), and/or any other suitable device. Likewise, in various embodiments, client device 102 may include a processor 109 and/or a memory device 111. As described herein, processor 109 executes instructions stored on memory device 111 to implement one or more processes, or portions of processes, for validation and/or authentication, as described herein.

Moreover, in at least some embodiments, client device 102 may also include an image capture device 120, such as one or more cameras, which may, as described herein, capture a code corresponding to how to connect to a user device (e.g., a QR code) and a biometric sample of a user. For example, as described herein, image capture device 120 may capture the image of biometric sample, such as a facial image and/or fingerprint sample, substantially contemporaneously with capturing an image of the user credential (e.g., a QR code associated with an mID of the user), such as in a single image or frame, and/or in a series or sequence of images or frames obtained within a short period of time (e.g., milliseconds, or seconds).

As used herein, the terms "contemporaneously" and "substantially contemporaneously" may thus refer to capture of the biometric sample and image of the user credential in a single image or sequence of images. Likewise, in some uses, the terms may refer to capture or receipt of the biometric sample and image of the user credential within a predefined period of time, such as within less than 5 milliseconds, less than 1 second, less than 10 seconds, less than 30 seconds, less than 60 seconds, less than 1 minute, less than 5 minutes, and/or any other desired period of time. In addition, in some embodiments, client device 102 may also store a user's credential sample 122. Specifically, in at least some embodiments, client device 102 may store a user's credential sample 122 (e.g., to memory device 111 and/or another memory device) following image capture of the user credential.

Communication interface 112 may be any wired and/or wireless communication interface that facilitates communication between client device 102 and any of systems 104-108 over network 103, where network 103 may include a wide-area-network, a local-area-network, the internet, and/or any other collection of networked computing devices. In some embodiments, communication interface 112 may also facilitate wireless communications using any of a variety of wireless protocols, such as WiFi, Bluetooth, cellular, NFC, and/or other protocol(s) in the radio frequency (RF) spectrum.

User interface 114 may be a touchscreen user interface, such as a capacitive touchscreen interface. In some embodiments, user interface 114 may include other user input and/or output peripheral devices, such as a keyboard, a mouse, a scanner, and the like. In some embodiments, user interface 114 may include a display device, such as a liquid crystal display (LCD), a light emitting diode (LED) display, an organic light emitting diode (OLED) display, a plasma display, an electroluminescent display, a quantum dot display, and the like. In some embodiments, user interface 114 may include a device configured to provide haptic feedback (e.g., vibration, etc.).

In some embodiments, credential validation system 104 may be a computer system that facilitates validation of a user credential by communicating with a database 108 storing, as examples, user credential data 105, such as driver's license data, other photo identification data and/or identification data, payment card data, and/or any other personally identifiable information (PII) that may be used to validate a user credential presented to system 100 by a user (e.g., validation of a certificate within the user credential). In some embodiments, validation system 104 is included in client device 102. Credential data 105 and other PII may be encrypted using any suitable encryption protocol or encryption algorithm to ensure the security of these data. Moreover, in various embodiments, credential validation system 104 may include a processor 113 and/or a memory device 115. As described herein, processor 113 executes instructions stored on memory device 115 to implement one or more processes, or portions of processes, for validation and/or authentication, as described herein.

In some embodiments, credential validation system 104 may also communicate, such as via network 103, with a database 108 to obtain credential data 105. More particularly, database 108 may be a government and/or non-government system that securely stores and/or warehouses any of a variety of credential data 105. In one example, database 108 may be a motor vehicles department database. Likewise, in another example, database 108 may be an airport security system (e.g., a transportation security authority system), and/or any other system responsible for maintaining credential data 105, PII, and the like. In other words, DMV's/DMV databases (e.g., 108) may or may not be contacted each time an mID is validated. In some embodiments, the license/mID is validated when it is created and carries a certificate. The certificate may be checked to make sure it is real and not expired but may not be checked with the DMV (e.g., no system of record (SOR) at the time of reading/validating, just when creating the ID/mID). This may be dependent on the situation. mID provides a mechanism for providing a "level of assurance" desired by the relying party from weak to strong. It is possible that in some cases a relying party may want to re-verify the credential against the SOR for the highest level of assurance while other relying parties would just rely on the certificate or even the representation of the mID (e.g., the visual representation of the mID on a device or the mID information sent electronically).

Authentication system 106 may be any system that facilitates authentication of a user, as described herein, such as any server system, any database system, any combination of database systems and server systems, and the like. In some embodiments, authentication system 106 is included in client device 102. In at least some implementations, authentication system 106 includes and/or is in communication with a database that stores biometric sample data 107, such as one or more facial images of a user, one or more fingerprint samples of the user, and/or any other biometric sample data 107, such as but not limited to, images of a user's iris, heartbeat data, genetic information, and the like. The biometric sample data 107 may be encrypted using any suitable encryption algorithm to ensure the security of the data. Moreover, in various embodiments, authentication system 106 may include a processor 117 and/or a memory device 119. As described herein, processor 117 executes instructions stored on memory device 119 to implement one or more processes, or portions of processes, for validation and/or authentication, as described herein.

FIG. 2 is a block diagram illustrating another example system 200 including client device 102 shown in FIG. 1.

In some embodiments, biometric sample data 107 is stored on client device 102. Storage of biometric sample data 107 on client device 102 may facilitate rapid authentication of a user without requesting biometric sample data 107 via network 103 from a different system. In one example, a rapid comparison of a scanned or image captured facial image to a facial image sample in the biometric sample data 107 and/or a rapid comparison of a scanned or image captured fingerprint sample to a fingerprint sample in the biometric sample data 107 may be accomplished when biometric sample data 107 is stored locally on client device 102. As a result, computer processing requirements and/or processing times may be reduced.

Another example advantage of storing at least some biometric sample data 107 on client device 102 is that a user may be authenticated when network 103 is unavailable and/or when network connectivity is otherwise sporadic. Yet another example advantage of storing biometric sample data 107 on client device 102 is that the security of a user's biometric sample data 107 may be improved. For example, storage of biometric sample data 107 only on client device 102 (e.g., and not on authentication system 106) may prevent hacking attempts against the biometric sample data 107, particularly where the biometric sample data 107 is encrypted on client device 102. Likewise, if client device 102 is a user device, such as a smartphone or another personal computing device, the security of biometric sample data 107 may be further improved by the encrypted storage of biometric sample data 107 only on the user's personal device.

In at least some embodiments, biometric sample data 107 may, additionally or alternatively, be securely stored in the cloud (e.g., by authentication system 106) in encrypted form, behind one or more network firewalls, and the like. Further, in some embodiments the 1:1 facial comparison may occur in the cloud or on another device (e.g., a computing device in a vehicle of an officer). In other words, data from a livestream generated by client device 102 is transmitted via network 103 to another device/the cloud, the 1:1 comparison occurs at the other device/the cloud, and the resulting output (e.g., match or no match) is transmitted via network 103 back to client device 102.

Figure 3:
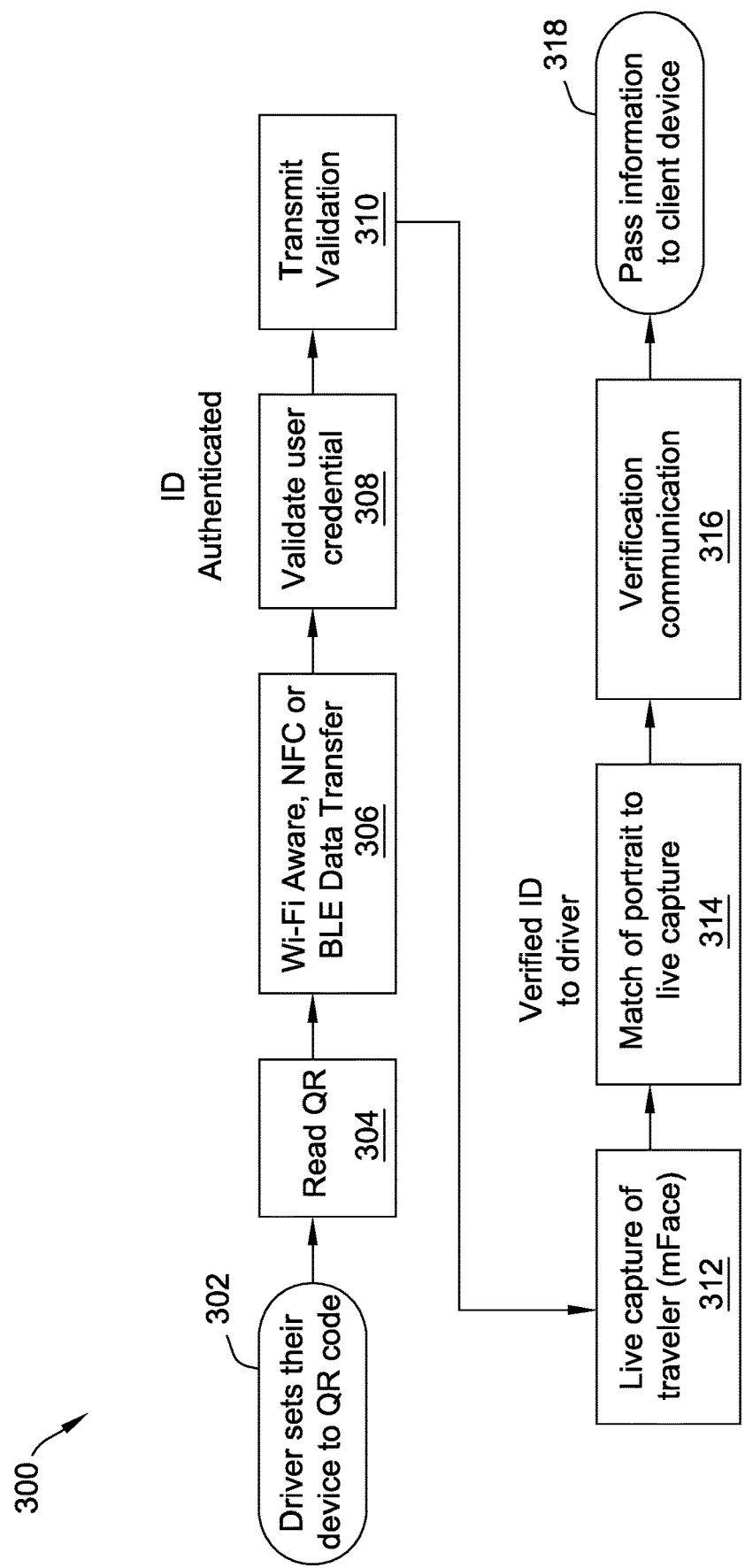
FIG. 3 is an example flowchart illustrating an example embodiment of a process for authentication and validation based on user credential and biometric data using the systems shown in FIGS. 1 and 2.

FIG. 3 is an example flowchart illustrating an example embodiment of a process 300 for authentication and validation based on user credential and biometric data using the systems 100, 200 shown in FIGS. 1 and 2.

In the example embodiment, process 300 includes a user providing 302 a code (e.g., as a QR code displayed at a smartphone, tablet, etc.) at a user device regarding how (e.g., via Bluetooth, Wi-Fi, NFC, etc.) a client device should receive a user credential (e.g., an mID). In some embodiments, the user credential may include any government issued and/or non-government issued form of identification, such as for example, but without limitation, an automobile driver license issued by a motor vehicles department and/or another state or federal agency, a corporate identification issued by an employer of the user, a payment card issued by a payment authority, such as a bank or other financial institution, and the like.

In at least some implementations, the user credential may include a variety of credential data, such as for example, personally identifiable information associated with the user (e.g., name, address, etc.) as well as any other information that may be desired. The user credential may also include biometric sample data, such as for example, a facial image of the user. It will be appreciated that the facial image may be obtained and/or printed on the user credential when the user credential is issued to the user, as well as that the user credential may include an expiration date, after which the user may be required to provide an updated facial image.

Client device 102 reads 304 the code, connects to the user device (e.g., via Bluetooth, Wi-Fi, NFC, etc.) and receives 306 data regarding the mID. Validation system 104 then validates 308 the mID (e.g., in accordance with ISO 18013-5 personal identification standards). Notably, in some embodiments, validation system 104 may be included in client device 102. In some embodiments, validation system 104 then transmits 310 a signal (e.g., across network 103) to at least one of client device 102 and authentication system 106. In some embodiments, feedback may be generated/provided at client device 102 to indicate that the mID has been validated (e.g., haptic and/or visual feedback).

Upon validating the mID, body camera/image capture device 120 captures 312 at least one live image/biometric of the user/driver's face for use in a comparison with a biometric attained from the now-verified document. The biometric may then be compared 314 with the live image/biometric (e.g., at client device 102 and/or authentication system 106). A verification signal is generated 316 indicating whether the user/driver has been authenticated (e.g., at authentication system 106) and, in embodiments where authentication system 106 is not included in device 102, is transmitted 318 to client device 102. In some embodiments, the verification may be conducted at client device 102 (e.g., when biometric sample data 107 is stored at client device 102, as shown in FIG. 2). In some embodiments, feedback may be generated/provided at client device 102 to indicate the user/driver has been authenticated (e.g., haptic and/or visual feedback).

Figure 4:
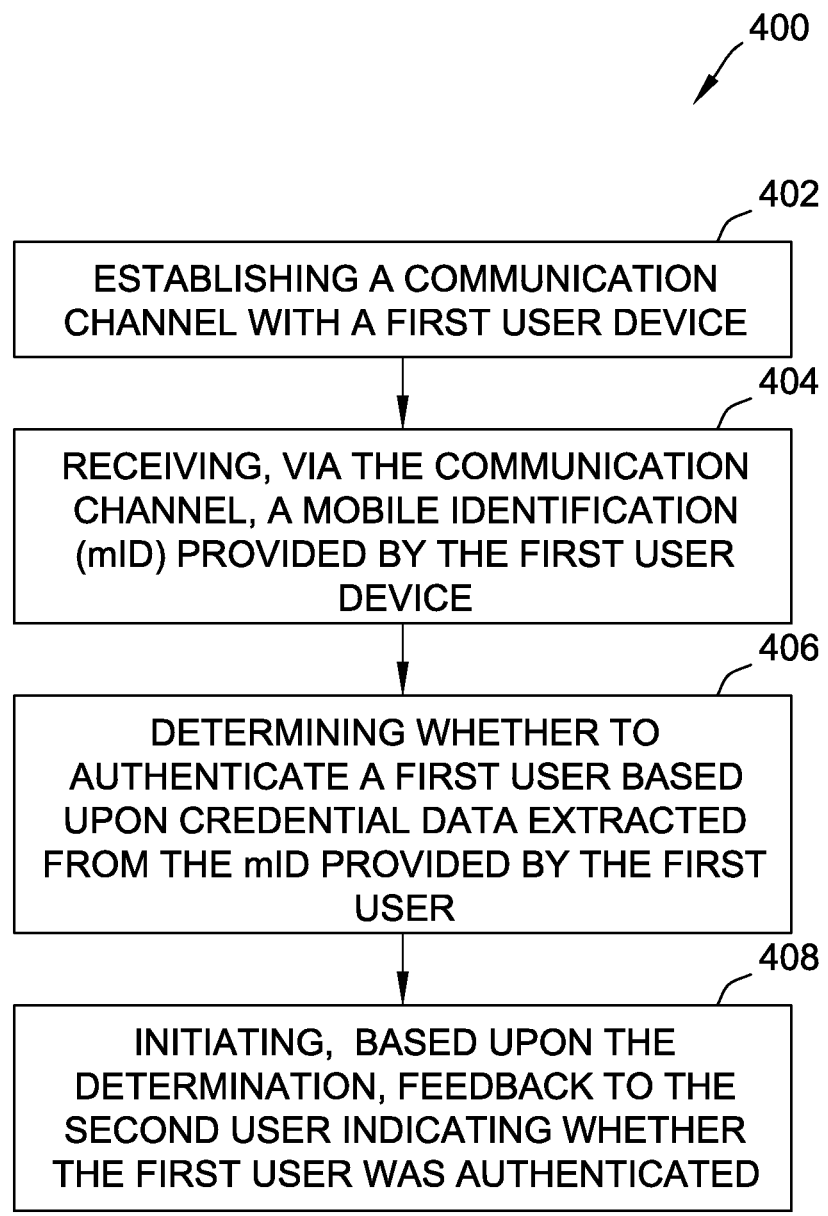
FIG. 4 is an example method for authentication and validation based on user credential and biometric data using the systems shown in FIGS. 1 and 2.

FIG. 4 is an example method 400 for authentication and validation based on user credential and biometric data using the systems 100, 200 shown in FIGS. 1 and 2.

Method 400 includes establishing 402, based upon data received at a camera device (e.g., device 120, such as a body camera) from a first user device associated with the first user, the camera device in communication with a processor, a communication channel with the first user device and receiving 404, via the communication channel, a mobile identification (mID) provided by the first user device. The method also includes determining 406 whether to authenticate the first user based upon credential data extracted from the mID provided by the first user and initiating 408, based upon the determination, feedback to the second user indicating whether the first user was authenticated.

In some embodiments, method 400 includes determining, based upon the mID, a first biometric sample associated with the first user, capturing, by the camera device, a second biometric sample associated the first user, comparing the first biometric sample to the second biometric sample, and determining whether to authenticate the first user based upon the mID provided by the first user and the comparison of the first biometric sample to the second biometric sample.

In some embodiments, method 400 includes comparing the first biometric sample to the second biometric sample captured by the camera device and determining whether to authenticate the first user by transmitting data regarding the second biometric sample to an authentication computing device (e.g., in authentication system 106) and receiving, from the authentication computing device and based upon a comparison between the first biometric sample and the second biometric sample at the authentication computing device, data indicating whether the first user was authenticated.

In some embodiments of method 400, the authentication computing device comprises at least one of the camera device, a cloud computing device, or second user device associated with the second user. In some embodiments of method 400, causing feedback to be provided further comprises, in initiating the feedback to the second user, initiating haptic feedback to the second user indicating whether the first user was authenticated. In some embodiments of method 400, causing feedback to be provided further comprises, in initiating the feedback to the second user, initiating visual feedback to the second user indicating whether the first user was authenticated.

Embodiments of the systems and methods described herein thus facilitate authentication and/or validation of a user based on user credential and/or biometric data. For example, in some embodiments, a user credential may be presented by a user and an image thereof captured to obtain a biometric sample of the user provided on the user credential. Other credential data, such as any of a variety of personally identifiable information or "PII," may also be provided on the user credential and captured or scanned as well. In some cases, the credential data may also be encoded on the user credential, such as in the form of a quick response (QR) code, and/or any of a variety of other suitable encoded formats.

In addition to obtaining the biometric sample and/or credential data, the systems described herein may obtain another biometric sample, such as biometric sample of the user obtained in substantially real time (e.g., via a body camera). In some embodiments, biometric samples may include facial images, including facial images obtained from photo identifications, as well as self-photographs or "selfies" of the user obtained substantially concurrently with a facial image obtained from the photo identification. In some embodiments, biometric samples may include fingerprint samples as well as a variety of other user biometrics that can be used for authentication purposes. In some cases, one or more additional copies of a user's biometric sample(s) may be securely stored on a client device and/or on a backend authentication system as well.

In operation, the one or more biometric samples may be compared to confirm or disconfirm that the person presenting the user credential and real time biometric sample are the same person. In other words, the one or more biometric samples described herein may be variously compared to authenticate the user. Likewise, in at least some embodiments, the credential data extracted or captured from the user credential presented by the user may be compared to stored credential data to confirm that the data extracted or captured from the user credential is valid, up to date, accurate, correct, and the like. In other words, the credential data may be validated, in addition to the authentication steps described herein.

The systems and methods described herein may be implemented using computer programming or engineering techniques including computer software, firmware, hardware or any combination or subset thereof, wherein the technical effects and specific improvements to the technology and technical field may include one or more of: (i) establishing, based upon data received at a camera device from a first user device associated with the first user, the camera device in communication with a processor, a communication channel with the first user device; (ii) receiving, via the communication channel, a mobile identification (mID) provided by the first user device; (iii) determining whether to authenticate the first user based upon credential data extracted from the mID provided by the first user; and (iv) initiating, based upon the determination, feedback to the second user indicating whether the first user was authenticated.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is generally not intended to imply certain embodiments require at least one of X, at least one of Y, and at least one of Z to each be present. Additionally, conjunctive language such as the phrase "at least one of X, Y, and Z," unless specifically stated otherwise, should be understood to mean any combination of at least one of X, at least one of Y, and at least one of Z.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc—read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for authenticating a first user to a second user, the system comprising:
   a memory device having computer executable instructions stored thereon;
   a camera device comprising a body camera and associated with the second user; and
   a processor in communication with the memory device and the camera device, wherein the processor is configured to execute the computer executable instructions that, when executed, cause the processor to:
   establish, based upon first data received at the camera device from a first user device associated with the first user, a communication channel with the first user device;
   receive, via the communication channel, a mobile identification (mID) provided by the first user device;
   based upon receiving the mID, automatically cause the camera device to capture second data comprising biometric data associated with the first user;
   determine whether to authenticate the first user based upon credential data extracted from the mID provided by the first user and comparing the captured second data to stored biometric data associated with the first user; and
   initiate, based upon the determination, feedback to the second user indicating whether the first user was authenticated, wherein the body camera establishes the communication channel, captures the second data, and initiates the feedback without receiving Physical input from the second user.

2. The system of claim 1, wherein the computer executable instructions, when executed, further cause the processor to:
determine, based upon the mID, the stored biometric data associated with the first user; and
compare the captured biometric data to the stored biometric data.

3. The system of claim 2, wherein an authentication computing device comprises at least one of the camera device, a cloud computing device, or second user device associated with the second user, and wherein the computer executable instructions, when executed, further cause the processor to compare the captured biometric data to the stored biometric data and determine whether to authenticate the first user by:
transmitting data regarding the captured biometric data to the authentication computing device; and
receiving, from the authentication computing device and based upon a comparison between the captured biometric data and the stored biometric data at the authentication computing device, data indicating whether the first user was authenticated.

4. The system of claim 1 wherein the computer executable instructions, when executed, in initiating the feedback to the second user, further causes the processor to initiate haptic feedback to the second user indicating whether the first user was authenticated.

5. The system of claim 1, wherein the computer executable instructions, when executed, in initiating the feedback to the second user, further causes the processor to initiate visual feedback to the second user indicating whether the first user was authenticated.

6. The system of claim 1, wherein the communication channel comprises at least one of bluetooth low energy (BLE), near-field communication (NFC), or Wi-Fi Aware.

7. A non-transitory, computer readable storage medium having instructions stored thereon that, in response to execution by a processor, cause the processor to:
establish, based upon first data received at a camera device from a first user device associated with a first user, the camera device comprising a body camera and in communication with the processor, a communication channel with the first user device;
receive, via the communication channel, a mobile identification (mID) provided by the first user device;
based upon receiving the mID, automatically cause the camera device to capture second data comprising biometric data associated with the first user;
determine whether to authenticate the first user based upon credential data extracted from the mID provided by the first user and comparing the captured second data to stored biometric data associated with the first user; and
initiate, based upon the determination, feedback to a second user indicating whether the first user was authenticated, wherein the body camera establishes the communication channel, captures the second data, and initiates the feedback without receiving physical input from the second user.

8. The non-transitory, computer readable storage medium of claim 7, wherein the instructions further cause the processor to:
determine, based upon the mID, the stored biometric data associated with the first user; and
compare the captured biometric data to the stored biometric data.

9. The non-transitory, computer readable storage medium of claim 8, wherein an authentication computing device comprises at least one of the camera device, a cloud computing device, or second user device associated with the second user, and wherein the instructions further cause the processor to compare the captured biometric data to the stored biometric data and determine whether to authenticate the first user by:
transmitting data regarding the captured biometric data to the authentication computing device; and
receiving, from the authentication computing device and based upon a comparison between the captured biometric data and the stored biometric data at the authentication computing device, data indicating whether the first user was authenticated.

10. A non-transitory, computer readable storage medium having instructions stored thereon that, in response to execution by a processor, cause the processor to:
establish, based upon first data received at a camera device from a first user device associated with a first user, the camera device comprising a body camera and in communication with the processor, a communication channel with the first user device;
receive, via the communication channel, a mobile identification (mID) provided by the first user device;
based upon receiving the mID, automatically cause the camera device to capture second data comprising biometric data associated with the first user;
determine whether to authenticate the first user based upon credential data extracted from the mID provided by the first user and comparing the captured second data to stored biometric data associated with the first user; and
initiate, based upon the determination, feedback to a second user indicating whether the first user was authenticated, wherein the body camera establishes the communication channel, captures the second data, and initiates the feedback without receiving physical input from the second user.

11. The non-transitory, computer readable storage medium of claim 7, wherein the instructions further cause the processor to, in initiating the feedback to the second user, initiate visual feedback to the second user indicating whether the first user was authenticated.

12. The non-transitory, computer readable storage medium of claim 7, wherein the communication channel comprises at least one of bluetooth low energy (BLE), near-field communication (NFC), or Wi-Fi Aware.

13. A computer-implemented method for authenticating a first user to a second user, the method comprising:
establishing, based upon first data received at a camera device from a first user device associated with the first user, the camera device comprising a body camera and in communication with a processor, a communication channel with the first user device;
receiving, via the communication channel, a mobile identification (mID) provided by the first user device;
based upon receiving the mID, automatically causing the camera device to capture second data comprising biometric data associated with the first user;
determining whether to authenticate the first user based upon credential data extracted from the mID provided by the first user and comparing the captured second data to stored biometric data associated with the first user; and
initiating, based upon the determination, feedback to the second user indicating whether the first user was authenticated, wherein the body camera establishes the communication channel, captures the second data, and initiates the feedback without receiving physical input from the second user.

14. The method of claim 13, further comprising:
determining, based upon the mID, the stored biometric data associated with the first user; and
comparing the captured biometric data to the stored biometric data.

15. The method of claim 14, wherein an authentication computing device comprises at least one of the camera device, a cloud computing device, or second user device associated with the second user, and wherein the method further comprises comparing the captured biometric data to the stored biometric data and determining whether to authenticate the first user by:
transmitting data regarding the captured biometric data to the authentication computing device; and
receiving, from the authentication computing device and based upon a comparison between the captured biometric data and the stored biometric data at the authentication computing device, data indicating whether the first user was authenticated.

16. The method of claim 13, wherein causing feedback to be provided further comprises, in initiating the feedback to the second user, initiating haptic feedback to the second user indicating whether the first user was authenticated.

17. The method of claim 13, wherein causing feedback to be provided further comprises, in initiating the feedback to the second user, initiating visual feedback to the second user indicating whether the first user was authenticated.

* * * * *